(12) United States Patent
Pack

(10) Patent No.: US 8,181,382 B2
(45) Date of Patent: May 22, 2012

(54) FISHING LURE

(75) Inventor: Mark Pack, Emory, TX (US)

(73) Assignee: Lake Fork Trophy Bait & Tackle, Emory, TX (US)

( * ) Notice: Subject to any disclaimer, the term of this patent is extended or adjusted under 35 U.S.C. 154(b) by 0 days.

(21) Appl. No.: 11/528,771

(22) Filed: Sep. 28, 2006

(65) Prior Publication Data
US 2008/0078114 A1  Apr. 3, 2008

(51) Int. Cl.
*A01K 85/00* (2006.01)
(52) U.S. Cl. ...................................... 43/42.15; 43/42.24
(58) Field of Classification Search .................. None
See application file for complete search history.

(56) References Cited

U.S. PATENT DOCUMENTS

| | | | | |
|---|---|---|---|---|
| 857,593 A * | 6/1907 | Brown | | 446/368 |
| 862,206 A * | 8/1907 | Sillman | | 446/368 |
| D147,901 S * | 11/1947 | Findlay | | D22/133 |
| 2,435,993 A * | 2/1948 | Zink | | 43/42.16 |
| 2,455,155 A * | 11/1948 | Baima | | 43/42.15 |
| 2,481,789 A * | 9/1949 | Smith | | 43/42.15 |
| 2,606,388 A * | 8/1952 | Croft, Jr. et. al. | | 43/42.15 |
| 3,108,389 A * | 10/1963 | McGuire | | 43/42.06 |
| 3,158,952 A * | 12/1964 | Creme | | 43/42.24 |
| 3,490,165 A | 1/1970 | Thomassin | | |
| 3,735,518 A * | 5/1973 | Kleine et al. | | 43/42.04 |
| 3,899,847 A * | 8/1975 | Dworski | | 43/42.09 |
| 3,983,656 A * | 10/1976 | Bain | | 43/42.24 |
| 4,907,364 A * | 3/1990 | Hedman | | 43/42.39 |
| 5,182,875 A * | 2/1993 | Righetti | | 43/42.24 |
| 5,261,183 A * | 11/1993 | Dworski | | 43/42.37 |
| 5,517,781 A * | 5/1996 | Paoletta, Jr. | | 43/42.06 |
| 5,522,170 A * | 6/1996 | Cole | | 43/42.11 |
| 5,640,798 A * | 6/1997 | Garst | | 264/328.1 |
| 5,678,350 A * | 10/1997 | Moore | | 43/42.37 |
| 5,787,634 A * | 8/1998 | Way | | 43/42.15 |
| 5,894,693 A * | 4/1999 | Davie | | 43/42.24 |
| 6,041,540 A * | 3/2000 | Potts | | 43/42.24 |
| 6,082,037 A * | 7/2000 | Malouf et al. | | 43/42.14 |
| 6,138,399 A * | 10/2000 | Wilson | | 43/42.24 |
| 6,192,618 B1 * | 2/2001 | Wackerman | | 43/42.31 |
| 6,385,896 B1 * | 5/2002 | Thomassin | | 43/42.03 |
| 6,405,477 B1 | 6/2002 | Huppert | | |
| 6,460,286 B1 * | 10/2002 | Wilson | | 43/42.15 |
| 6,910,295 B2 * | 6/2005 | Nakahashi | | 43/42.15 |
| 6,941,696 B2 | 9/2005 | Kato | | |
| 7,000,346 B1 | 2/2006 | Jussaume | | |
| 7,308,773 B1 | 12/2007 | McNaughton | | |
| 7,610,714 B1 | 11/2009 | McNaughton | | |
| 2004/0148845 A1 * | 8/2004 | Nakahashi | | 43/42.15 |
| 2006/0260176 A1 * | 11/2006 | Yeung | | 43/42.15 |
| 2007/0175083 A1 * | 8/2007 | Wilson et al. | | 43/42.15 |

* cited by examiner

*Primary Examiner* — Kimberly Berona
(74) *Attorney, Agent, or Firm* — John G. Fischer, Esq.; Paul D. Lein, Esq.; Scheef & Stone, L.L.P.

(57) ABSTRACT

A fishing lure that has realistic motion when retrieved from a cast is presented. The lure has three sections: a head section, a tail section, and a mid-section. The head and tail sections are formed to resemble the head and tail areas of live bait. The mid-section has a series of segments that are joined by connectors that allow the segments to move back and forth when water impacts on the sidewalls of the segments. The overall shape of the fishing lure in one embodiment is a shad baitfish. Other embodiments include the overall shape of a lizard, a waterdog salamander, a blue gill fish, a goby fish, or a snake or worm.

5 Claims, 8 Drawing Sheets

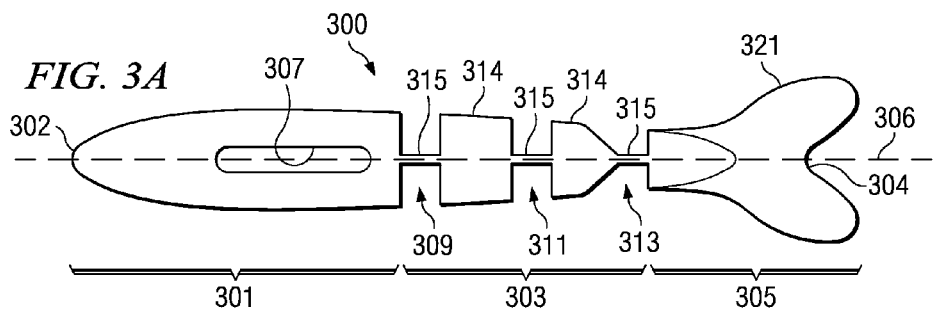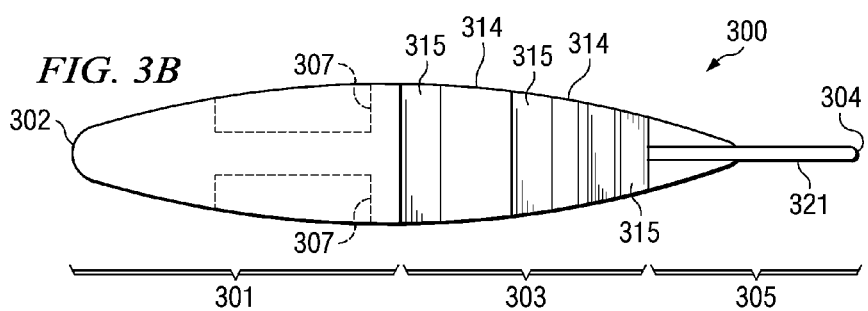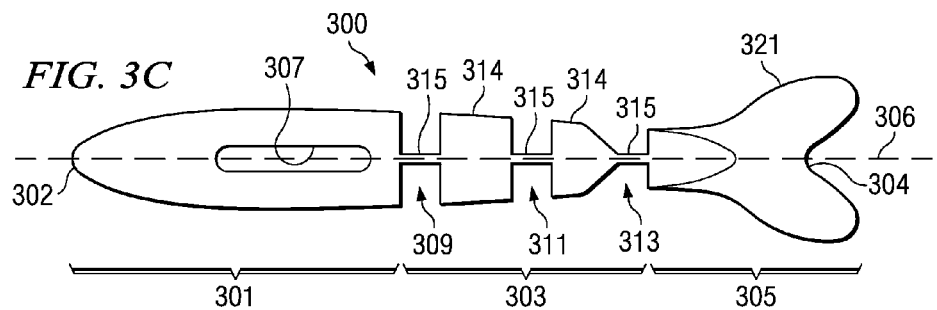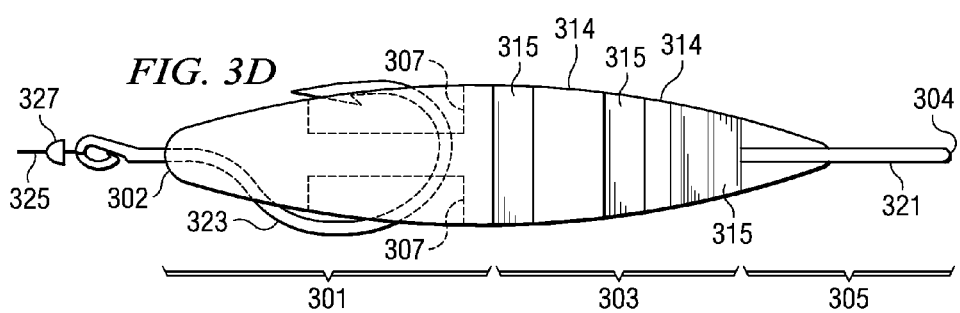

FISHING LURE

TECHNICAL FIELD

The present invention relates generally to fishing gear, and more specifically to fishing lures that have realistic motion.

BACKGROUND

Fishing is enjoyed around the world. From professional fishermen to the weekend fishermen, there has been a constant search for an ideal lure. This ideal lure would simulate live bait in all of its attributes, such as the way live bait looks, the way it smells, and, most particularly, the way in which live bait moves through the water.

There have been many lures that have attempted to simulate this movement of live bait through the water. Two such lures, as examples, are described in U.S. Pat. No. 6,941,696 to Kato (the '696 patent) and U.S. Pat. No. 7,000,346 to Jussaume (the '346 patent). FIG. 1 illustrates the '696 patent, which is a lure 100 made of a hard inner portion 101 and a soft outer portion 103. In this lure 100 there are two parts to the hard inner portion 101, which are connected by an elastic component 105. The hard inner portions 101 and the elastic component 105 are covered by the soft outer portion 103 in the shape of the lure 100. The soft outer portion 103 and the elastic component 105 allow the lure 100 to bend back and forth, thereby attempting to mimic live bait. However, in this design, movement is limited and there is no mechanism for inducing a movement in the lure 100 when it is in the water.

FIG. 2 illustrates the '346 patent, which is a top-water lure 200 with angled channels 201 in the top and bottom surfaces. These channels 201 run the longitudinal length of the top-water lure 200. When an angler retrieves the top-water lure 200 after casting, the water flowing through the angled channels 201 cause the top-water lure 200 to rise to the surface of the water, supposedly giving the appearance of a fleeing baitfish. While this design may cause the top-water lure 200 to rise to the surface of the water, this design does not allow for any bending of the top-water lure 200 to more closely imitate live bait.

As stated, the '346 patent and the '696 patent attempt to imitate the real actions of live bait. However, these lures do not do a realistic job of imitating the movements of live bait. A new lure with a more realistic imitation of the actions of live bait is needed.

SUMMARY OF THE INVENTION

These and other problems are generally solved or circumvented, and technical advantages are generally achieved, by preferred embodiments of the present invention that allow for a fishing lure with a realistic motion.

One aspect of the present invention includes a fishing lure that has a head section, a mid-section, and a tail section. The mid-section has one or more segments that are interconnected by one or more connectors that allow the segments to rotate relative to each other and to the head and tail section to which they are attached.

Another aspect of the present invention includes a fishing lure comprising a first section with a longitudinal axis and a central plane that extends vertically from the longitudinal axis. A second section is comprised of one or more segments, with each segment being connected by multiple sets of grooves that allow one segment to rotate in relation to an adjacent segment. A third section is connected to the second section on an opposing end from the first section.

Yet another aspect of the present invention includes a fishing lure with a head section, a tail section on an opposing end of the lure from the head section, and a mid-section. The mid-section is interposed between the head and tail section, and is comprised of one or more segments that are interconnected to the other segments and the other sections by one or more connectors that allow the segments to rotate. The overall shape of the fishing lure is in the shape of a live animal.

By using these features in a fishing lure, the fishing lure will move through the water in a fashion that realistically imitates the motions of a live animal. This will attract more fish to the lure, and make it more effective in catching the desired type of fish.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A-3D are the top view, side view, bottom view, and rigged side view, respectively, of a fishing lure in the shape of a shad baitfish, in accordance with an embodiment of the present invention;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
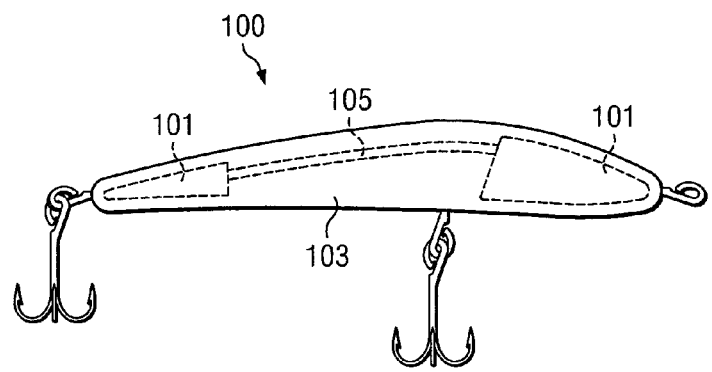
FIG. 1 is a side view of a fishing lure in the prior art with hard and soft portions that allow the lure to bend.
Figure 2:
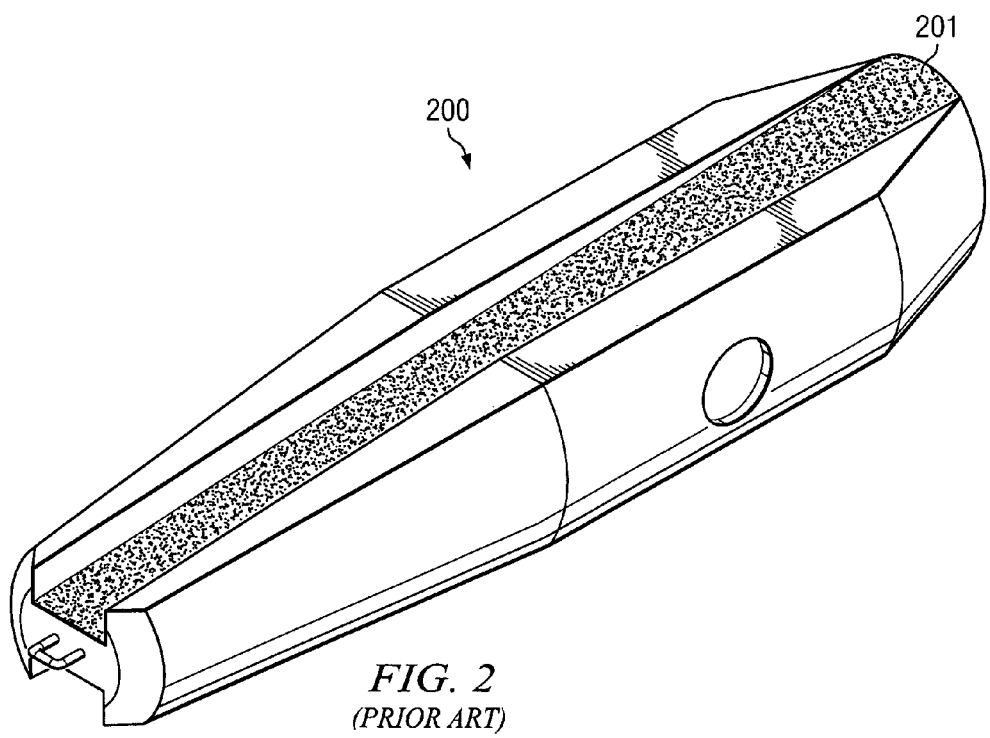
FIG. 2 is a perspective view of a fishing lure in the prior art with channels that run from the front of the lure to the rear of the lure.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As used herein, the term "substantially" is to be construed as a term of approximation.

FIG. 3A-3C show a top view, a side view, and a bottom view, respectively, of a fishing lure 300 in the shape of a shad baitfish, in accordance with an embodiment of the present invention. The fishing lure 300 is preferably made from a soft plastic, as is known in the art. However, other flexible materials such as soft silicon or soft rubber may alternatively be used. The fishing lure 300 may be formed by casting a mold in the shape of the fishing lure 300, inserting molten plastic into the mold, and allowing the plastic to set in the shape of the mold. Other methods, such as laser machining of a single piece of plastic, may also be used to form the fishing lure 300.

The overall dimensions of the fishing lure 300 will be dependent upon the overall shape of the fishing lure 300 and the type of fish to be caught with the fishing lure 300. In an embodiment in which the fishing lure 300 has the overall shape of a shad baitfish, the fishing lure 300 has a length of between about 2 inches to about 12 inches, a width of between about 0.7 inches and about 2 inches, and a height of between about 0.25 inches and 3 inches.

The fishing lure 300 could optionally be impregnated with one or more attractants (not shown) in order to help attract fish and make the fishing lure 300 more like live bait. The preferred attractants used in the fishing lure 300 are garlic and salt. It should be noted that one skilled in the art would recognize that there are many attractants that could be impregnated into the fishing lure 300 and that the type of attractant may depend upon the type of fish desired to be caught. Examples of other attractants include cinnamon, herbs, sugar, shrimp flavor, garlic flavor, cheese flavor, combinations thereof, and the like. The attractants described above are meant as examples only and are not meant to limit the present invention.

The fishing lure 300 has three distinct sections along a longitudinal axis. A first section 301 is the head section of the fishing lure 300, and carries the bulk of the weight of the fishing lure 300 to stabilize the fishing lure 300 as it is being retrieved. The first section 301 extends from a leading end 302 of the fishing lure 300 (the end that will eventually be connected to the fishing line) along the longitudinal axis of the fishing lure 300. The exterior surface of the first section 301 may optionally be textured to resemble the appearance of the front half of a shad fish, including eyes, a mouth, and scales.

The dimensions of the first section 301 are dependent upon the overall shape of the fishing lure 300. The overall shape is dependent upon the bait to be imitated and upon the fish to be caught. In an embodiment wherein the fishing lure 300 has the overall shape of a shad baitfish, the first section 301 preferably has a length of between about 1.5 inches to about 2.5 inches. However, smaller or larger dimensions may be used.

Optionally, two hook slots 307 can be placed into the first section 301 so as to allow for the placement of a hook 323 (described below with reference to FIG. 3D). These hook slots 307 are used to allow the hook 323 to lay within the exterior surface of the fishing lure 300 until a fish attempts to swallow the fishing lure 300, thereby helping to prevent the hook 323 from being snagged on underwater plants as the fishing lure 300 is being retrieved. The first hook slot 307 may be placed on a top of the first section 301 and the second hook slot 307 may be placed on an opposing bottom of the first section 301.

The dimensions of the hook slot 307 are dependent upon the size of the fishing lure 300 and the size of the hook 323 to be used with the fishing lure 300. The larger the first section 301 of the fishing lure 300, or the larger the hook 323 to be used with the fishing lure 300, the larger the hook slots 307 may be.

A second section 303 of the fishing lure 300 extends along the longitudinal axis of the fishing lure 300 from the first section 301, occupying less than half the longitudinal length of the fishing lure. The second section 303 preferably has one or more sets of grooves. For illustrative purposes only, the embodiment illustrated in FIGS. 3A-3D has three sets of grooves. A first pair of opposing grooves 309, a second pair of opposing grooves 311, and a third pair of opposing grooves 313 separate segments 314 of the second section from each other and from the first section 301 and the third section 305. These sets of grooves preferably extend generally parallel to from the top of the fishing lure 300 to the bottom of the fishing lure 300 on opposite sides of the longitudinal axis, and extend inwards from the exterior surface of the fishing lure 300. In alternative embodiments, more or fewer than three sets of grooves could be used.

The two grooves of the first set (i.e., pair) of grooves 309 are separate and distinct from each other but aligned with each other on opposite sides of the central plane 306 of the fishing lure 300, as are the grooves of the second set of grooves 311 and the grooves of the third set of grooves 313. The grooves are preferably vertical (as viewed in FIGS. 3A and 3B) and rectilinear having dimensions which are dependent upon the size of the fishing lure 300. However, each set of grooves preferably has a length and a depth that are sufficient to allow each segment 314 to freely rotate to a sufficient angle to allow a motion representative of the live bait. In an embodiment such as that depicted in FIGS. 3A-3D, it has been found that a rotation to about 90 relative to either an adjacent segment 314 or an adjacent section (either the first section 301 or the third section 305) without the adjacent segment 314 or section hindering the movement is sufficient. In an embodiment wherein the fishing lure 300 has an overall shape of a shad baitfish, the first set of grooves 309, the second set of grooves 311, and the third set of grooves 313 each preferably have a length of between about ¹⁄₁₆ of an inch and about 2 inches.

In the preferred embodiment, the first set of grooves 309, the second set of grooves 311, and the third set of grooves 313 each leave a connective strip 315 of material between segments 314 of the second section 303 of the fishing lure 300. As shown in FIGS. 3A-3C, the connective strips 315 separate and isolate opposing grooves of each pair 309, 311, and 313. Similarly, sections 314 separate and isolate grooves 309 from grooves 311, and grooves 311 from grooves 314, on each side of central plane 306. The dimensions of this connective strip 315 are dependent upon the size and shape of the fishing lure 300, but the connective strips 315 are preferably sufficiently thin to allow the segments of the fishing lure 300 to freely rotate perpendicular to the longitudinal axis, as described above with respect to the segments 314. In an alternative embodiment a connective strip 315 in one of the sets of grooves may be separated into multiple connective strips within the same groove.

The sidewalls of the first set of grooves 309, the second set of grooves 311, and the third set of grooves 313 extend from the exterior surface of the fishing lure 300 to the connective strips 315 connecting the segments 314. These sidewalls may either extend straight in from the exterior surface (approximately at a right angle to the exterior surface) or the sidewalls may be angled away from the middle of each groove such that the water can more easily flow into or out of the groove. In the preferred embodiment in which the fishing lure 300 is in the shape of a shad baitfish, the sidewalls of the first set of grooves 309 and the second set of grooves 311 extend at approximately a right angle to the exterior surface of the fishing lure 300. Likewise, the tailing sidewalls of the third set of grooves 313 (the sidewalls closest to the tailing end 304 of the fishing lure 300) extend inwards at approximately a right angle. However, in the preferred embodiment the leading sidewalls of the third set of grooves 313 (the sidewalls closest to the leading end 302 of the fishing lure 300) are angled away from the middle of the groove so as to allow water to more easily flow into the groove and to prevent the segment 314 from inhibiting the movement of the third section 305.

In the preferred embodiment, the sidewalls of the first set of grooves 309 and the second set of grooves 311 extend inwards from the sides of the fishing lure 300 at right angles relative to the exterior surface of the fishing lure 300. Likewise, the tailing sidewalls of the third set of grooves 313 (the sidewalls closest to the tailing end 304 of the fishing lure 300), extend inwards from the exterior surface of the fishing lure 300 at right angles to the exterior surface of the fishing lure 300. The leading sidewalls of the third set of grooves 313 (the sidewalls closest to the leading end 302 of the fishing lure 300) preferably extend inwards at an angle that is less than a right angle, and at a preferred angle of about 37°, in a direction from the leading end 302 to the tailing end 304 of the fishing lure 300. Alternatively, any of the sidewalls of the first set of grooves 309, the second set of grooves 311, or the third set of grooves 313 can be made at either a right angle, or at an angle that is less than a right angle to the exterior surface of the fishing lure 300.

The first set of grooves 309, the second set of grooves 311, and the third set of grooves 313 provide the fishing lure 300 the ability to imitate live bait. As the fishing lure 300 is retrieved after being cast, the water flows from the leading end 302 of the fishing lure 300 to the tailing end 304 of the fishing lure 300. As it flows over the fishing lure 300, the water enters the first set of grooves 309, the second set of grooves 311, and the third set of grooves 313, impacting on the tailing sidewalls of each set of grooves and causing the tailing end 304 of the fishing lure 300 to move to one side. As the tailing end 304 moves to one side, the water that is flowing into the grooves on that side will apply more pressure than the water flowing into the grooves on the opposing side of the fishing lure 300. This causes the tailing end 304 of the fishing lure 300 to move in the opposite direction, and causes a back and forth motion that realistically imitates the motion of live bait in the water.

Figure 5A:
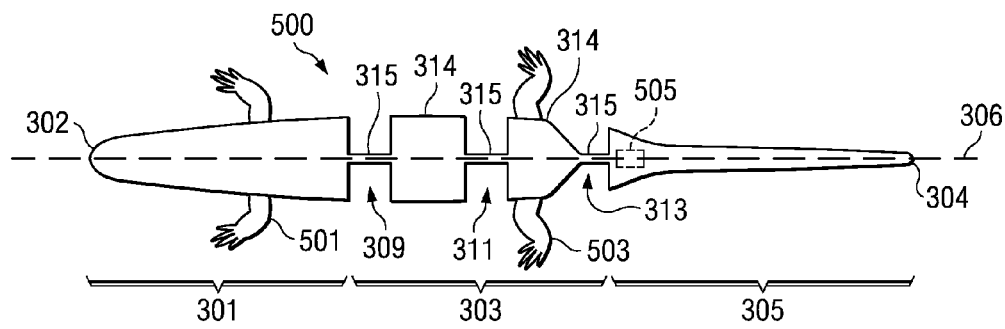
FIG. 5A-5C are the top view, side view, and bottom view, respectively, of a fishing lure in the shape of a lizard, in accordance with an embodiment of the present invention.
Figure 5B:
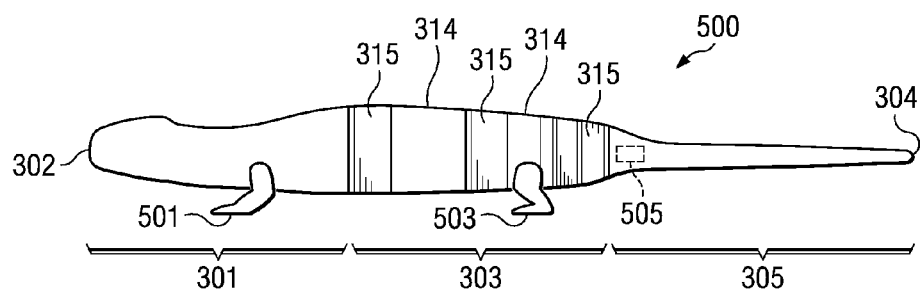
Figure 5C:
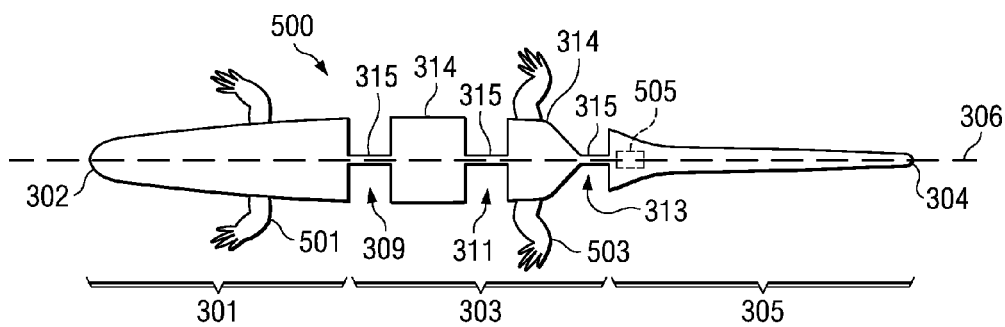

The third section 305 of the fishing lure 300 is the tail section. The third section 305 extends along the longitudinal axis of the fishing lure 300 from the second section 303 to the tail end 304 of the fishing lure 300. In a preferred embodiment the third section 305 has the shape of a tail 321, and includes a flat portion which intersects with the body of the fishing lure and which is preferably situated horizontally (as viewed in FIG. 3B), or perpendicular to the central plane 306 of the fishing lure 300, unlike a live shad baitfish. This configuration provides the fishing lure 300 with stability and control as the fishing lure 300 is being retrieved. Alternatively, the tail 321 could be situated parallel to the central vertical plane. In yet another alternative, the third section 305 could merely taper to a point, instead of becoming a tail 321, as illustrated in FIGS. 5A-5C.

In the embodiment in which the fishing lure 300 is in the shape of a shad baitfish, the fishing lure 300 also uses the weight from the extra material used to form the tail 321 to give the fishing lure 300 more stability and a more realistic movement as the second section 303 and the third section 305 rotate back and forth. In an embodiment in which there is no tail 321, a small weight may be added to the third section 305 to enhance the realistic motions of the fishing lure 300.

FIG. 3D illustrates a method by which a hook 323, line 325, and weight 327 may be attached to the fishing lure 300 in accordance with an embodiment of the present invention. FIG. 3D is similar to FIG. 3B but with the addition of a hook 323, a line 325, and a weight 327. In an embodiment the hook 323 is threaded through the leading end 302 of the fishing lure 300 and exits through the bottom of the fishing lure 300. The hook 323 is then threaded through one of the hook slots 307 in the bottom of the fishing lure 300 and then vertically through the first section 301 of the fishing lure 300 until it exits through the opposing hook slot 307. In its final position the hook 323 rests within the groove made by the hook slot 307. A line 325 is connected to the hook 323, and allows the fisherman to retrieve the fishing lure 300 after a cast. A weight 327 may optionally be attached to the line 325 in either a static fashion (where the weight 327 does not move relative to the line 325) or else in a sliding fashion (where the weight 327 may move along the line 325) to allow for better placement and control of the fishing lure 300 during casting and retrieval.

However, as one skilled in the art will realize, there are many other methods that can be used to rig the fishing lure 300. The method of rigging the fishing lure 300 described above is not meant to limit the present invention to the described embodiment. Any method that may be used to rig the fishing lure 300, such as a weightless rig, a Texas rig, a Carolina rig, or a nail rig may alternatively be used.

Figure 4A:
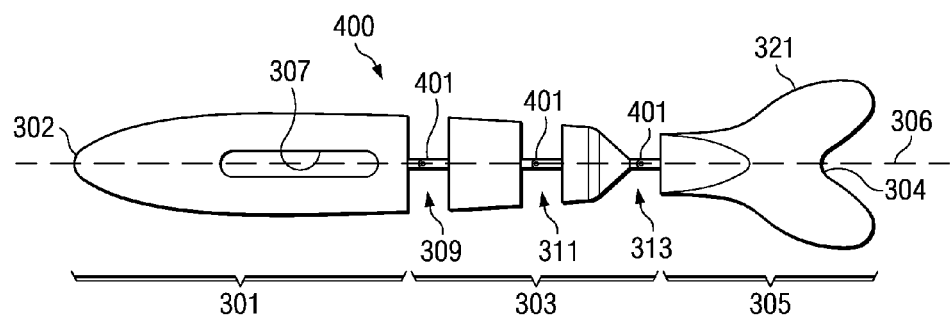
FIGS. 4A-4C are the top view, side view, and bottom view, respectively, of a fishing lure in the shape of a shad baitfish with a swivel joint, in accordance with an embodiment of the present invention.
Figure 4B:
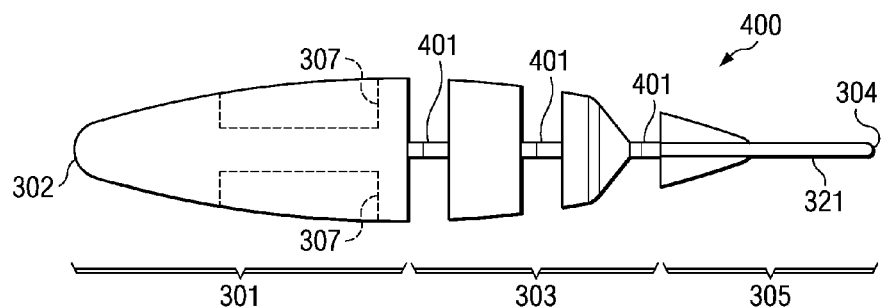
Figure 4C:
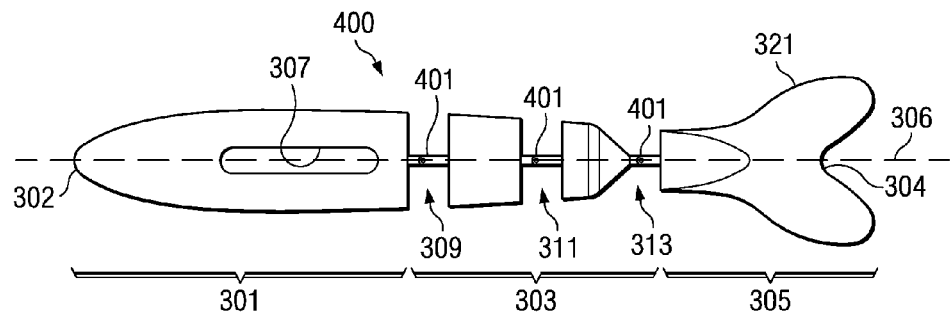

FIGS. 4A-4C illustrate another embodiment of the fishing lure 400, in which the connective strips 315 of material located within the grooves are replaced with swivel joints 401 that allow the tailing end 304 of the fishing lure 400 to move back and forth as the fishing lure 400 is retrieved through the water. These swivel joints 401 preferably have the same total width as the connective strips 315 to allow for the full back and forth motion of the tailing end 304 of the fishing lure 400.

It should be noted that, while a specific type of connector is described above, one with ordinary skill in the art will recognize that there are numerous fashions in which to connect the different parts of the second section 303. For example, one of ordinary skill in the art will recognize that other types of connectors, such as joints or connective strips of soft rubber, could alternatively be used to join the sections. Any of these types of connectors could be used as long as it allows the different sections of the second section 303 of the fishing lure 400 to rotate back and forth. The above description is not meant to limit the present invention to the materials and pieces listed above.

FIGS. 5A-5C illustrate a fishing lure 500 in the shape of a lizard in accordance with an embodiment of the present invention. In this embodiment, the first section 301 has two small additional protrusions 501 extending from the sides of the fishing lure 500 that are in the shape of legs and the second section 303 has two small additional protrusions 503 extending from the sides of the fishing lure 500 that are in the shape of legs. The third section 305 may be tapered to resemble the shape of a lizard's tail. In this embodiment a small weight 505 may preferentially be added to the third section 305 in order to give the fishing lure 500 more stability and control. The exterior surface of the fishing lure 500 is preferably textured with the appropriate patterning to make it more closely resemble a lizard.

Figure 6A:
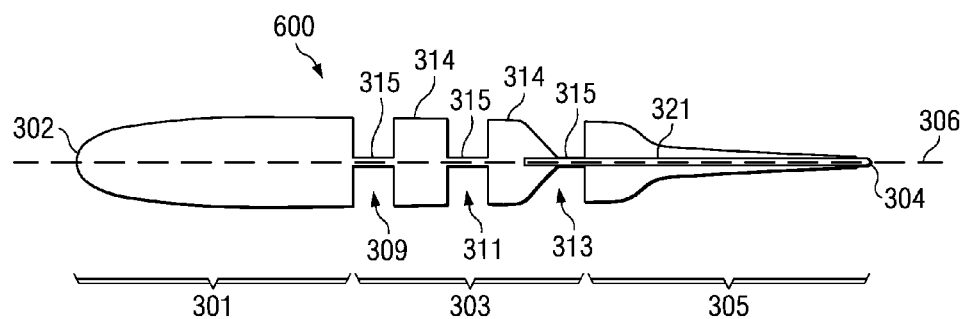
FIG. 6A-6C are the top view, side view, and bottom view, respectively, of a fishing lure in the shape of a waterdog salamander, in accordance with an embodiment of the present invention.
Figure 6B:
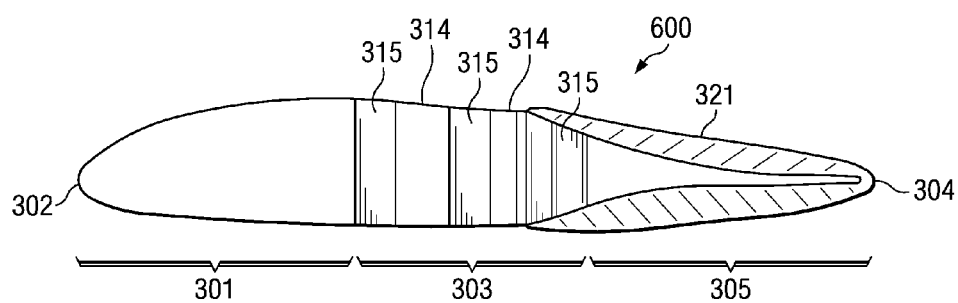
Figure 6C:
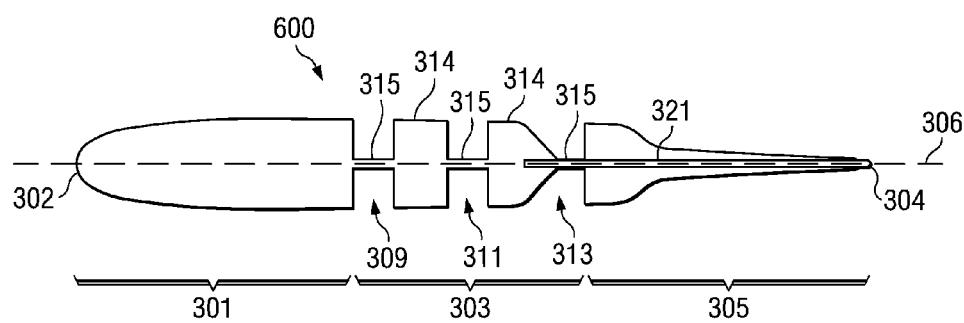

FIGS. 6A-6C illustrate a fishing lure 600 in the shape of a "waterdog" salamander in accordance with an embodiment of the present invention. The shape of this fishing lure 600 is similar to the shad baitfish embodiment described in FIGS. 3A-3C. However, the waterdog embodiment preferably has a tail 321 in the third section 305 that is substantially parallel with the central plane 306 of the fishing lure 600. The outer dimensions and curvatures of this embodiment are modified with respect to the shad baitfish embodiment, making the waterdog embodiment more closely resemble a waterdog salamander, and the exterior surface of the fishing lure 600 is preferably textured to make it more closely resemble a waterdog.

Figure 7A:
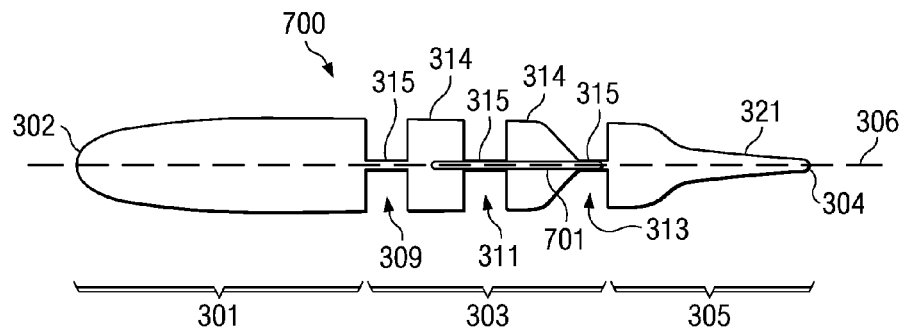
FIG. 7A-7C are the top view, side view, and bottom view, respectively, of a fishing lure in the shape of a blue gill fish, in accordance with an embodiment of the present invention.
Figure 7B:
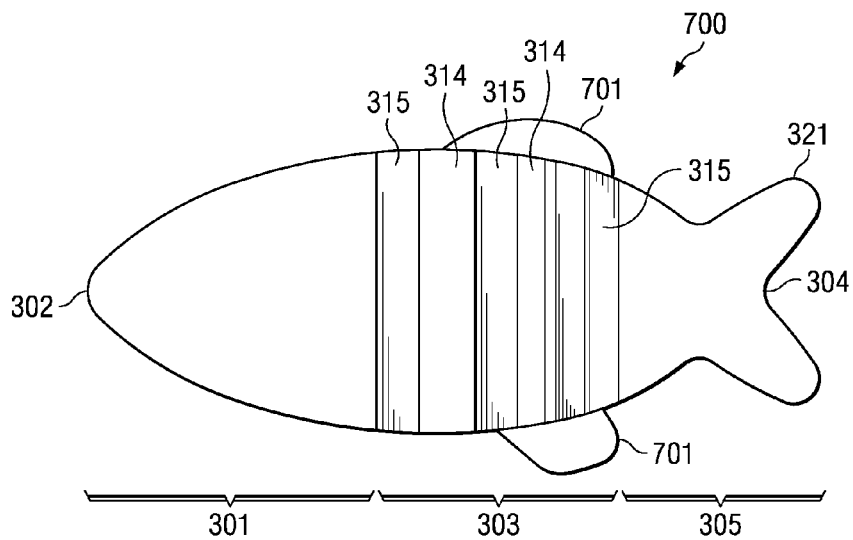
Figure 7C:
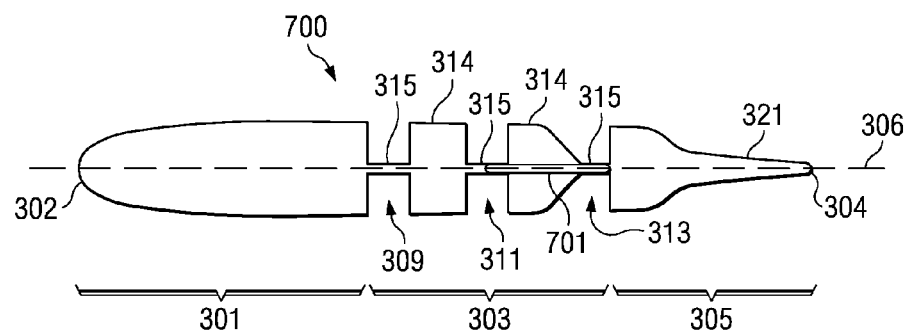

FIGS. 7A-7C illustrate a fishing lure 700 in the shape of a "blue gill" or "bream" fish in accordance with an embodiment of the present invention. The shape of this fishing lure 700 is similar to the shad embodiment as described in FIGS. 3A-3C, but with additional fins 701 extending outward from the fishing lure 700 along the top and the bottom of the second section 303. Additionally, the tail 321 is substantially parallel to the central plane 306 of the fishing lure 700. The outer dimensions and curvatures of this embodiment are also modified with respect to the shad embodiment, making the blue gill embodiment more closely resemble a blue gill fish, and the exterior surface of the fishing lure 700 is preferably textured to make it more closely resemble a blue gill fish.

Figure 8A:
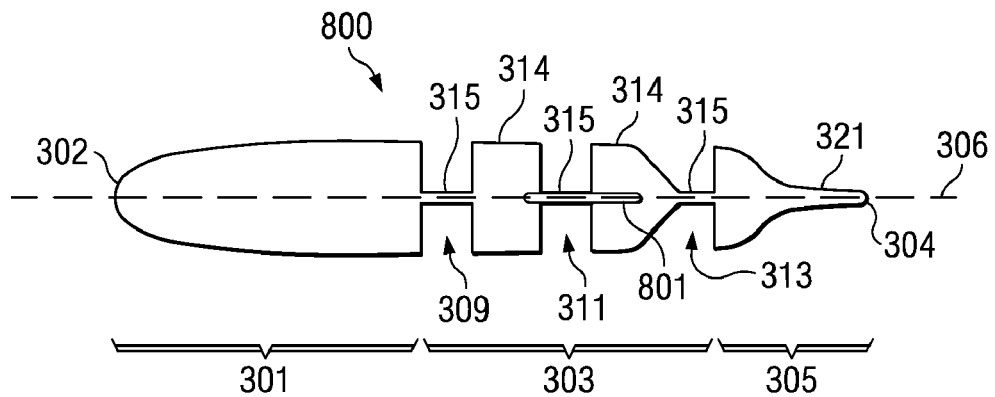
FIG. 8A-8C are the top view, side view, and bottom view, respectively, of a fishing lure in the shape of a goby fish, in accordance with an embodiment of the present invention.
Figure 8B:
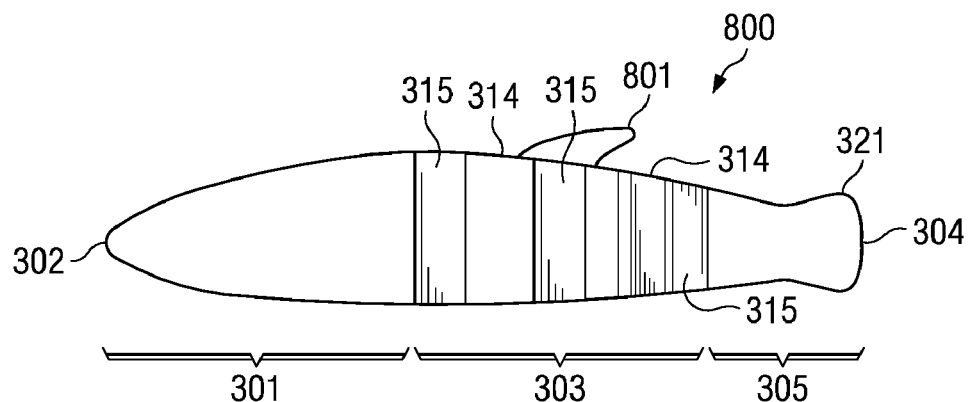
Figure 8C:
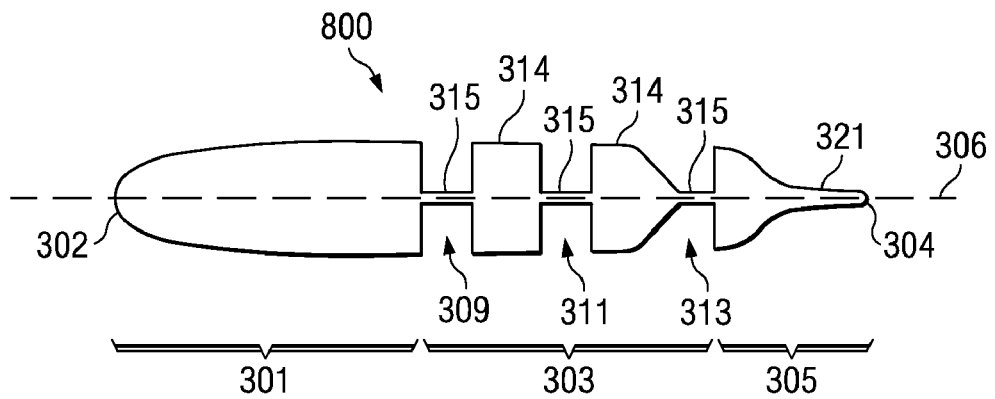

FIGS. 8A-8C illustrate a fishing lure 800 in the shape of a goby fish in accordance with an embodiment of the present invention. The shape of this fishing lure 800 is similar to the shad embodiment described in FIGS. 3A-3C, but with an additional fin 801 extending from the top of the second section 303. The outer dimensions and curvatures of this embodiment are modified with respect to the shad embodiment, making the goby embodiment more closely resemble a goby fish, and the exterior surface of the fishing lure 800 is preferably textured to make it more closely resemble a goby fish.

Figure 9A:
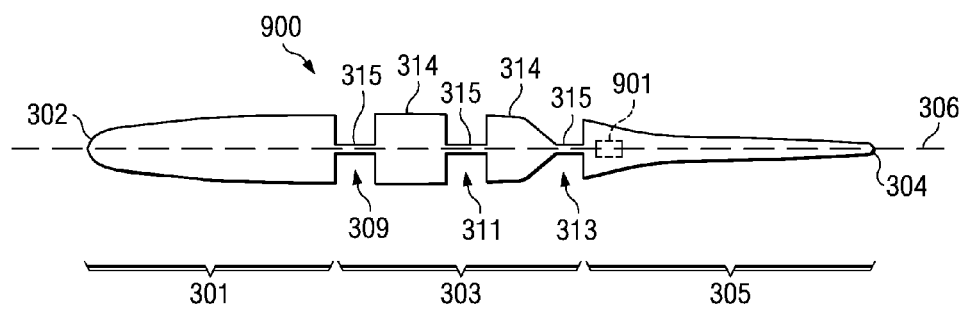
FIG. 9A-9C are the top view, side view, and bottom view, respectively, of a fishing lure in the shape of a snake or worm, in accordance with an embodiment of the present invention.
Figure 9B:
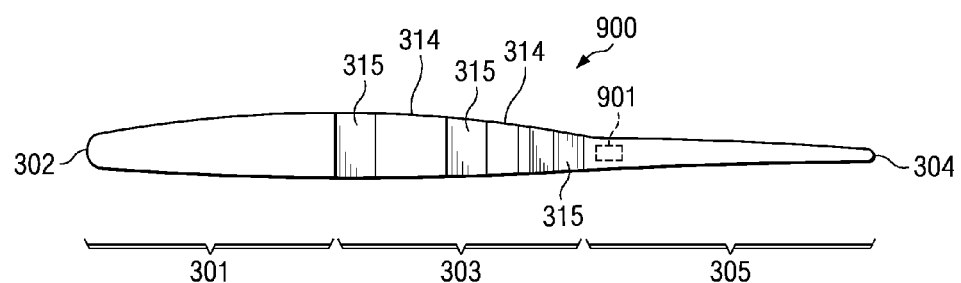
Figure 9C:
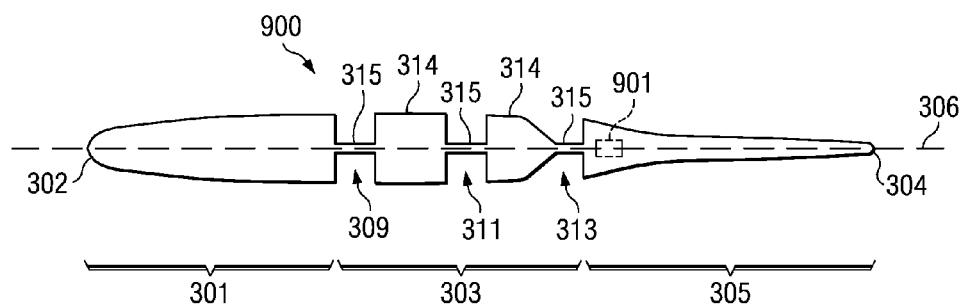

FIGS. 9A-9C illustrate a fishing lure 900 in the shape of a snake or worm in accordance with an embodiment of the present invention. The shape of this fishing lure 900 is similar to the shad embodiment described in FIGS. 3A-3C. However, instead of the third section 305 being in the shape of a tail, the third section 305 in this embodiment tapers to a point, to more closely resemble the tail of a snake or worm. A small weight 901 is preferably added to the third section 305 to enhance the back and forth motion of the fishing lure 900. The outer dimensions and curvatures of this embodiment are modified with respect to the shad embodiment, making the snake or worm embodiment more closely resemble a snake or worm, and the exterior surface of the fishing lure 900 is preferably textured to make it more closely resemble a snake or worm.

As one of ordinary skill in the art will appreciate, in the present invention the first set of grooves 309, the second set of grooves 311, and the third set of grooves 313 in the preferred embodiment will cause the back end of the fishing lure 300 to move back and forth as the fishing lure 300 moves through the water. This will cause the fishing lure 300 to move as live bait would move, thereby making it more attractive for fish.

Although the present invention and its advantages have been described in detail, it should be understood that various changes, substitutions and alterations can be made herein without departing from the spirit and scope of the invention as defined by the appended claims. For example, there are multiple materials that could be used to form the fishing lure. Any of these materials that achieve substantially the same result as the corresponding embodiments described herein may be utilized according to the present invention.

Moreover, the scope of the present application is not intended to be limited to the particular embodiments of the methods described in the specification. As one of ordinary skill in the art will readily appreciate from the disclosure of the present invention, methods presently existing, or later to be developed, that perform substantially the same function or achieve substantially the same result as the corresponding embodiments described herein may be utilized according to the present invention. Accordingly, the appended claims are intended to include within their scope such methods.

What is claimed is:

1. A fishing lure comprising:
a head section at a first end;
a tail section at a second end, the tail section being on an opposing end from the head section;
a mid-section interposed between the head section and the tail section;
the head section comprising a weight greater than the combined weight of the mid-section and tail section;
the head section having a substantially continuous outer surface, a longitudinal axis and a central plane that extends vertically along the longitudinal axis;
the mid-section comprising in sequence:
a first connector attached on a first end to the head section;
a first set of grooves aligned with each other on opposite sides of the first connector;
a first segment attached to the opposite end of the first connector, and having a substantially continuous exterior surface;
a second connector attached on a first end to the first segment;
a second set of grooves aligned with each other on opposite sides of the second connector;
a second segment attached to the opposite end of the second connector, and having a substantially continuous exterior surface;
a third connector attached on a first end to the second segment; and,
a third set of grooves aligned with each other on opposite sides of the third connector;
the tail section attached to the opposite end of the third connector;
the first and second grooves forming sidewalls extending straight inward from an exterior surface of the lure at approximately at a right angle to the exterior surface;
the first grooves having a length and depth sufficient to allow the first segment to rotate to about 90 degrees perpendicular to the longitudinal axis and relative to the head section;
the second grooves having a length and depth sufficient to allow the second segment to rotate to about 90 degrees perpendicular to the longitudinal axis and relative to the first segment;
the third grooves forming a leading sidewall extending inward from an exterior surface of the lure at substantially less than 90 degrees at a direction away from a leading end to a trailing end, and a trailing sidewall extending straight inward from an exterior surface of the lure at approximately at a right angle to the exterior surface;
the third grooves having a length and depth sufficient to allow the tail section to rotate to about 90 degrees perpendicular to the longitudinal axis and relative to the mid-section; and,
the tail section having a tail shape that is substantially perpendicular to the central plane.

2. The fishing lure of claim 1 wherein the third grooves form a leading sidewall extending inward from an exterior surface of the lure at about 37 degrees at a direction away from the leading end to the trailing end.

3. The fishing lure of claim 1, further comprising an attractant.

4. The fishing lure of claim 1, further comprising a plurality of hook slots located in the head section.

5. The fishing lure of claim 1, further comprising a multitude of fins extending outward from the head section or the mid-section.

* * * * *